United States Patent
Knizhnik et al.

(10) Patent No.: US 11,940,591 B2
(45) Date of Patent: Mar. 26, 2024

(54) GAMMA RAY LOGGING TOOL WITH DETECTOR WINDOW

(71) Applicant: Nabors Drilling Technologies USA, Inc., Houston, TX (US)

(72) Inventors: Sergei Knizhnik, Exton, PA (US); Marian L. Morys, Downingtown, PA (US)

(73) Assignee: Nabors Drilling Technologies USA, Inc., Houston, TX (US)

( * ) Notice: Subject to any disclaimer, the term of this patent is extended or adjusted under 35 U.S.C. 154(b) by 332 days.

(21) Appl. No.: 17/305,741

(22) Filed: Jul. 14, 2021

(65) Prior Publication Data
US 2022/0043178 A1 Feb. 10, 2022

Related U.S. Application Data

(60) Provisional application No. 63/062,904, filed on Aug. 7, 2020.

(51) Int. Cl.
*G01V 5/12* (2006.01)
*E21B 47/01* (2012.01)

(52) U.S. Cl.
CPC ............ *G01V 5/12* (2013.01); *E21B 47/01* (2013.01)

(58) Field of Classification Search
CPC ................................ G01V 5/12; E21B 47/01
See application file for complete search history.

(56) References Cited

U.S. PATENT DOCUMENTS

| | | | | | |
|---|---|---|---|---|---|
| 4,628,202 A | * | 12/1986 | Minette | .................. | G01V 5/125 250/262 |
| 4,661,700 A | * | 4/1987 | Holenka | ................ | G01V 5/125 250/269.3 |
| 4,691,102 A | * | 9/1987 | Schultz | .................. | G01V 5/125 250/266 |
| 4,698,501 A | * | 10/1987 | Paske | ..................... | G01V 5/125 250/254 |
| 4,879,463 A | * | 11/1989 | Wraight | .................. | G01V 5/12 250/269.2 |
| 5,021,652 A | * | 6/1991 | Arnold | ...................... | G01T 1/20 250/366 |
| 5,134,285 A | * | 7/1992 | Perry | ...................... | G01V 5/12 250/269.3 |
| 5,184,692 A | * | 2/1993 | Moriarty | .................. | G01V 5/08 175/50 |
| 5,608,215 A | * | 3/1997 | Evans | .................... | G01V 5/107 250/269.2 |
| 5,659,169 A | * | 8/1997 | Mickael | ................... | G01V 5/12 250/269.3 |
| 5,804,820 A | * | 9/1998 | Evans | .................... | G01V 5/104 250/269.2 |

(Continued)

Primary Examiner — Blake C Riddick
(74) Attorney, Agent, or Firm — Abel Schillinger, LLP

(57) ABSTRACT

A system including a logging tool that can detect gamma rays in a wellbore, where the logging tool can have a window formed in an outer surface of a drill collar that allows increased sensitivity of a gamma ray detector assembly housed within the drill collar, with a body of the drill collar radially surrounding the gamma ray detector assembly, where the window can be filled with a material, and where the windows provide increased sensitivity to gamma rays in a wellbore in an azimuthal direction allowing azimuthal mapping of the gamma rays in formation surrounding the wellbore.

20 Claims, 12 Drawing Sheets

(56) References Cited

U.S. PATENT DOCUMENTS

| | | | | |
|---|---|---|---|---|
| 5,841,135 A * | 11/1998 | Stoller | | G01N 23/083 |
| | | | | 250/269.3 |
| RE36,012 E * | 12/1998 | Loomis | | G01V 5/107 |
| | | | | 250/269.4 |
| 6,942,043 B2 | 9/2005 | Kurkoski | | |
| 8,307,703 B2 | 11/2012 | Moake | | |
| 8,975,574 B2 | 3/2015 | Huiszoon et al. | | |
| 2004/0178337 A1* | 9/2004 | Kurkoski | | G01T 3/08 |
| | | | | 250/269.4 |
| 2004/0178346 A1* | 9/2004 | Williams | | G01V 5/125 |
| | | | | 250/363.01 |
| 2004/0200274 A1* | 10/2004 | Moake | | G01V 5/125 |
| | | | | 73/152.05 |
| 2004/0251048 A1* | 12/2004 | Kurkoski | | E21B 47/01 |
| | | | | 175/41 |
| 2006/0102834 A1* | 5/2006 | Mickael | | G01V 5/08 |
| | | | | 250/269.1 |
| 2009/0147907 A1* | 6/2009 | Wraight | | G01V 5/125 |
| | | | | 378/1 |
| 2009/0283691 A1* | 11/2009 | Stoller | | G01V 5/10 |
| | | | | 250/390.1 |
| 2010/0132434 A1* | 6/2010 | Moake | | E21B 47/01 |
| | | | | 73/1.01 |
| 2013/0061668 A1* | 3/2013 | Moake | | G01V 5/04 |
| | | | | 73/152.01 |
| 2014/0034821 A1* | 2/2014 | Evans | | G01V 5/04 |
| | | | | 250/269.1 |
| 2014/0034822 A1* | 2/2014 | Evans | | G01V 5/08 |
| | | | | 250/269.1 |
| 2014/0097336 A1* | 4/2014 | Evans | | G01V 5/14 |
| | | | | 250/267 |
| 2014/0346336 A1* | 11/2014 | Huiszoon | | G01V 5/08 |
| | | | | 29/428 |
| 2016/0123137 A1* | 5/2016 | Liu | | E21B 7/06 |
| | | | | 250/254 |
| 2016/0320521 A1* | 11/2016 | Mauborgne | | G01V 5/101 |
| 2017/0176632 A1* | 6/2017 | Manclossi | | G01V 5/06 |
| 2018/0188408 A1* | 7/2018 | Mickael | | G01V 5/06 |
| 2018/0356555 A1* | 12/2018 | Climent | | G01T 1/24 |
| 2019/0204470 A1* | 7/2019 | Kuespert | | G01V 5/04 |
| 2019/0227189 A1* | 7/2019 | Lentz | | G01V 5/12 |
| 2021/0156245 A1* | 5/2021 | Neely | | E21B 47/017 |
| 2021/0333432 A1* | 10/2021 | Galford | | C22C 14/00 |
| 2023/0258073 A1* | 8/2023 | Mlcak | | E21B 49/00 |
| | | | | 175/50 |

\* cited by examiner

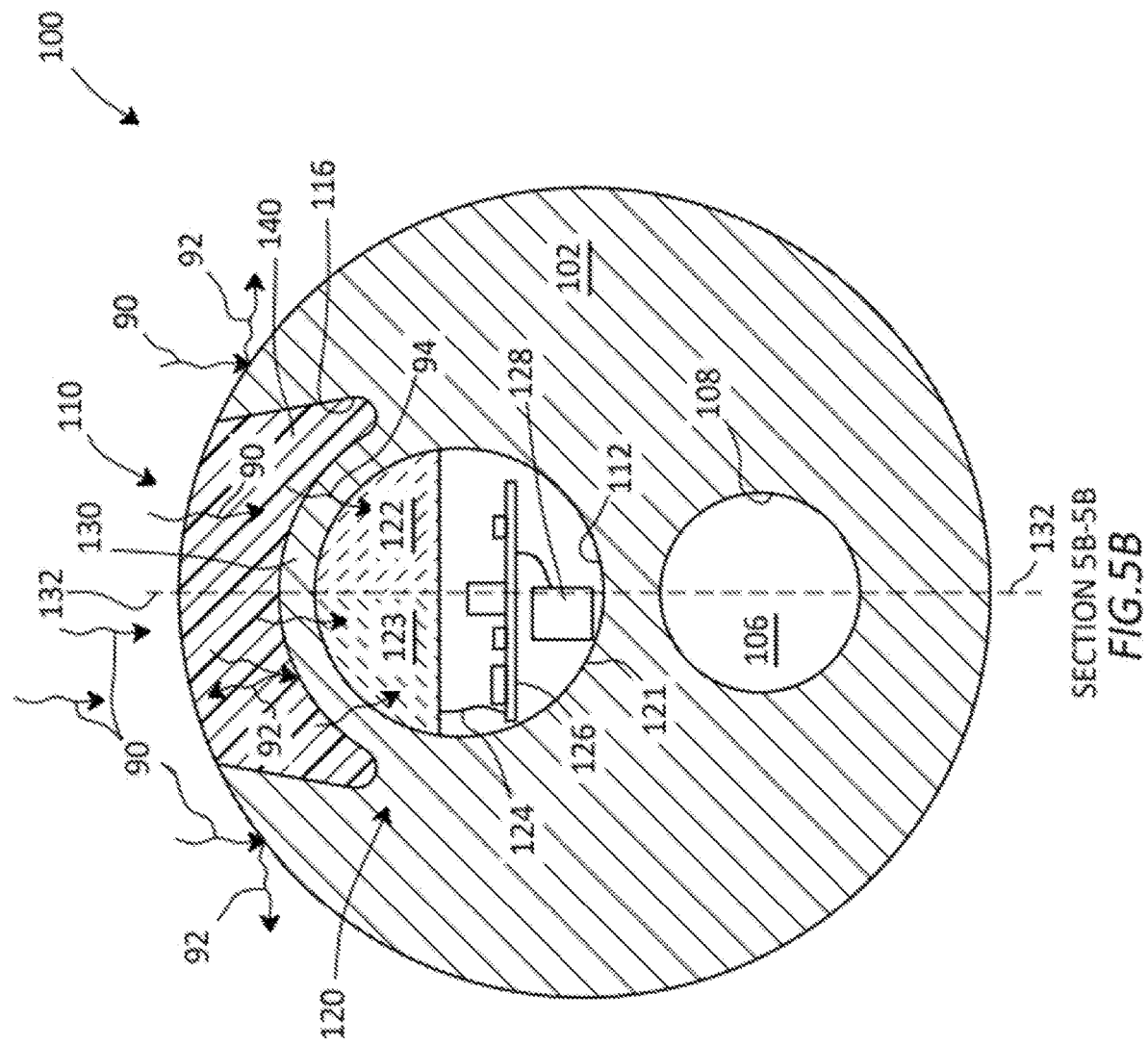

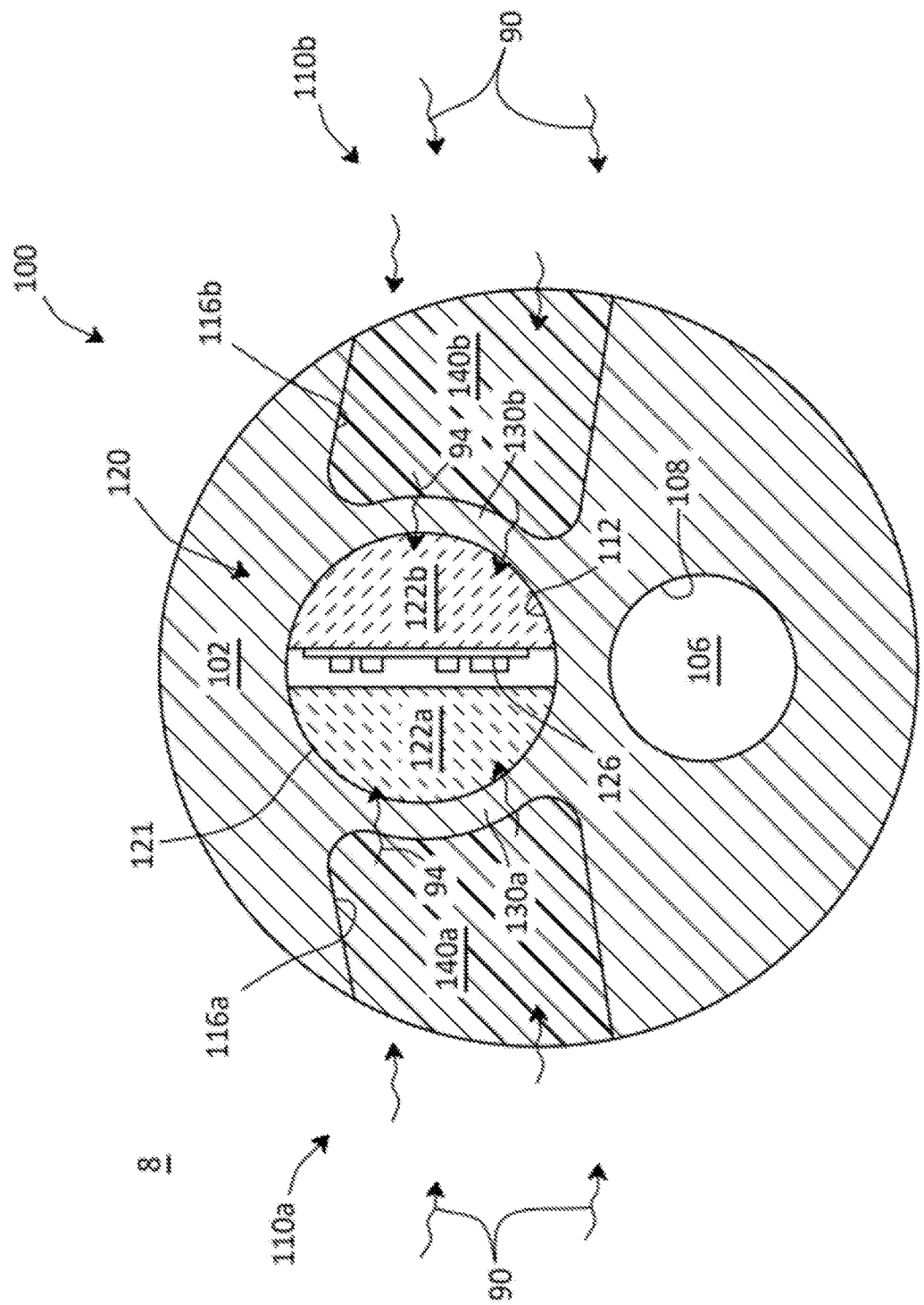

SECTION 7B-7B

GAMMA RAY LOGGING TOOL WITH DETECTOR WINDOW

CROSS REFERENCE TO RELATED APPLICATION(S)

This application claims priority under 35 U.S.C. § 119(e) to U.S. Provisional Application No. 63/062,904, entitled "GAMMA RAY LOGGING TOOL WITH DETECTOR WINDOW," by Sergei KNIZHNIK et al., filed Aug. 7, 2020, which application is assigned to the current assignee hereof and incorporated herein by reference in its entirety.

TECHNICAL FIELD

The present invention relates, in general, to the field of drilling and processing of wells. More particularly, present embodiments relate to a system and method for detecting and logging radiation in a wellbore while drilling a wellbore during subterranean operations.

BACKGROUND

Gamma Ray spectroscopy is the quantitative study of the energy spectra of gamma-ray sources and can be used to identify characteristics of a formation surrounding a wellbore. Gamma ray detectors can typically include a scintillation crystal and a photomultiplier, where the scintillation crystal absorbs the gamma radiation (i.e., highly energetic light photons) from a radiation source and produces short bursts of light that can be detected by the photomultiplier. The amplitude of these pulses (measured as a total charge produced from the photomultiplier) is proportional to the energy of the gamma photon captured. In subterranean operations in a wellbore, only single photons are usually detected at a time, with the probability of two gamma photons coming at the same time being very small as the radiation levels present in the earthen formation are generally from low-level radiation sources. The energy levels of the detected pulses form a spectrum that can be used to resolve the proportions of the radioactive elements in the earthen formation, which are primarily Potassium (K), Uranium (U), and Thorium (Th) and the products of their decay which can dominate natural radioactivity in the earthen formation. The frequency of the detected pulses can reflect the level of radioactivity in general and that can indicate how much of the radioactive elements are present. For example, 1 ppm of U would produce the same energy spectrum as 10 ppm of U, but the number of pulses per second would be 10 times higher.

A gamma ray detector can be transported along the wellbore to measure the gamma ray spectrum, which includes a count rate and intensity of the detected pulses at various depths in the wellbore. The detected pulses can be recorded as the gamma ray detector is transported along the wellbore and correlated to a depth in the wellbore at which the detected pulses were recorded. This can be referred to as "logging" the gamma ray spectrum. The logging can be performed between drilling activities, where a drill string is removed from the wellbore to lower the gamma ray detector into the wellbore.

However, the logging can also be performed while the drill string remains in the wellbore, whether it is actively advancing the wellbore or idle in the wellbore. Logging the detected pulses while the wellbore is being drilled can be referred to as Logging While Drilling (LWD) or Measuring While Drilling (MWD). LWD or MWD can be very beneficial since it does not require a drill string to be removed from the wellbore to measure the gamma ray spectrum of the formation surrounding the wellbore.

A typical gamma ray detector can be disposed in a pressure housing with a relatively small thermal mass, which can make the detector well-coupled to temperature changes in the wellbore, such as changes in mud temperature (e.g., when the mud circulation rates change). Since a gain of a detector is highly dependent on its temperature, any rapid swings of temperature make the gain highly unstable affecting the spectral accuracy of the gamma ray spectrum measurements.

Electronics that control the detector can typically be located outside of the pressure housing, requiring electrical connections between them to go through one or more High-Pressure, High Temperature (HPHT) bulkheads that are rated at high voltage (typically up to 2 KV). The presence of the HPHT High-Voltage (HPHTHV) bulkheads can reduce the overall reliability of the tool and make servicing it more difficult.

Additionally, due to the insolating characteristics of high-density material (e.g., metal, concrete, etc.) to gamma ray transmissions, the pressure housing tends to be placed outside a drill string on which it is mounted (e.g., in a recess on an outer surface of the drill string) causing the pressure housing to be well-coupled to the pressures and temperatures in an annulus of the wellbore. Also, clamping/securing the pressure housing to the outer surface of the drill string positions the pressure housing where the drill string strain nears its highest values, which can also reduce the overall reliability of the gamma ray detector. Therefore, improvements in the art of gamma ray spectrum logging are continually needed.

SUMMARY

In accordance with an aspect of the disclosure, a system for performing a subterranean operation is provided, where the system can include a tool for detecting gamma rays, the tool may include: a body; a gamma ray detector assembly disposed within the body, such that the body radially surrounds the gamma ray detector assembly, with the gamma ray detector assembly configured to detect the gamma rays; and a window formed in an outer surface of the body, such that the window is axially aligned with the gamma ray detector assembly.

In accordance with another aspect of the disclosure, a system for performing a subterranean operation is provided, where the system can include a tool for detecting gamma rays, the tool may include: a body; a gamma ray detector assembly disposed within the body, such that the body radially surrounds the gamma ray detector assembly, with the gamma ray detector assembly configured to detect the gamma rays; and a first window and a second window formed in an outer surface of the body, such that the first window and the second window are axially aligned with the gamma ray detector assembly.

In accordance with another aspect of the disclosure, a method for performing a subterranean operation, where the method can include receiving gamma rays from a formation into a logging tool, with the gamma rays passing through a portion of a body of a drill collar and being absorbed into a gamma ray detector assembly which is disposed within the body; detecting the absorbed gamma rays along a wellbore via the gamma ray detector assembly; indicating, via the logging tool, an azimuthal orientation of the absorbed gamma rays relative to the wellbore; and logging, via the logging tool, the detected gamma rays, and the indicated azimuthal orientation.

BRIEF DESCRIPTION OF THE DRAWINGS

These and other features, aspects, and advantages of present embodiments will become better understood when the following detailed description is read with reference to the accompanying drawings in which like characters represent like parts throughout the drawings, wherein:

FIGS. 5B-5C are representative partial cross-sectional views along cross-sectional line 5B-5B, as indicated in FIG. 5A, of a gamma ray detector assembly and a material filled window, in accordance with certain embodiments;

FIGS. 7B-7C are representative partial cross-sectional views along cross-sectional line 7B-7B, as indicated in FIG. 7A, of a gamma ray detector assembly and multiple associated material filled windows that can be substantially transparent to gamma rays, in accordance with certain embodiments.

DETAILED DESCRIPTION

The following description in combination with the figures is provided to assist in understanding the teachings disclosed herein. The following discussion will focus on specific implementations and embodiments of the teachings. This focus is provided to assist in describing the teachings and should not be interpreted as a limitation on the scope or applicability of the teachings.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise.

The use of the word "about," "approximately," or "substantially" is intended to mean that a value of a parameter is close to a stated value or position. However, minor differences may prevent the values or positions from being exactly as stated. Thus, differences of up to ten percent (10%) for the value are reasonable differences from the ideal goal of exactly as described. A significant difference can be when the difference is greater than ten percent (10%).

As used herein, "tubular" refers to an elongated cylindrical tube and can include any of the tubulars manipulated around a rig, such as "tubular segment," "tubular stand," and "tubular string," as well as "pipe," "pipe segment," "pipe stand," "pipe string," "casing," "casing segment," "casing string," or "drill collar."

Figure 1:
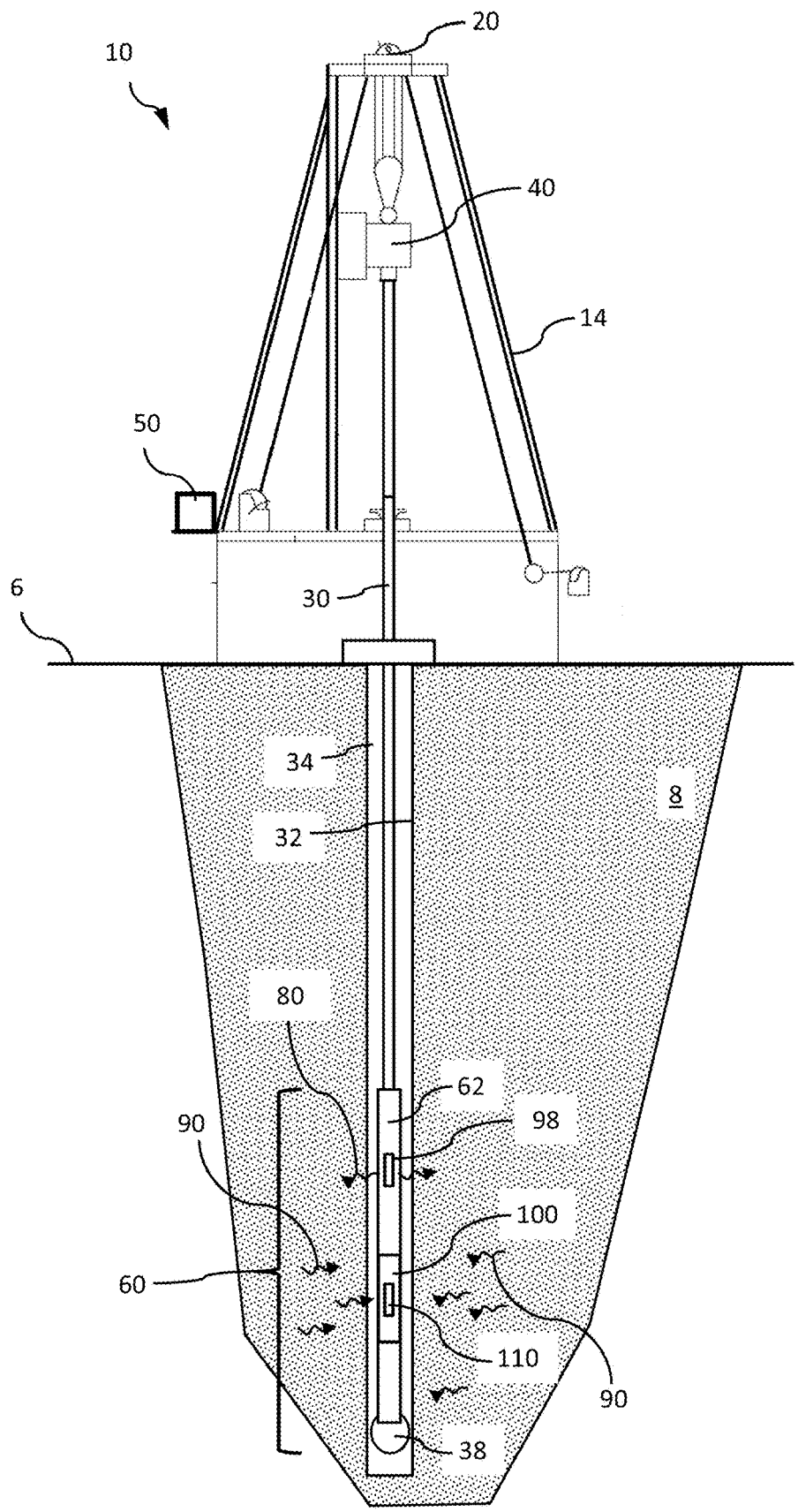
FIG. 1 is a representative partial cross-sectional view of a rig being used to drill a wellbore in an earthen formation, in accordance with certain embodiments.

FIG. 1 is a representative partial cross-sectional view of a rig 10 being used to drill a wellbore 32 in an earthen formation 8. FIG. 1 shows a land-based rig, but the principles of this disclosure can equally apply to off-shore rigs, as well. The rig 10 can include a top drive 40 with a traveling block 20 used to raise or lower the top drive 40. A derrick 14 extending from the rig floor, can provide the structural support of the rig equipment for performing subterranean operations (e.g., drilling, treating, completing, producing, testing, etc.). The rig can be used to extend a wellbore 32 through the earthen formation 8 by using a drill string 30 having a Bottom Hole Assembly (BHA) 60 at its lower end. The BHA can include a drill bit 38 and multiple drill collars 62, with one or more of the drill collars including instrumentation for LWD and MWD operations. One such instrument can be a tool 100 for detecting gamma rays along the wellbore 32 for producing a gamma ray spectrum of the wellbore 32. The BHA can communicate the LWD or MWD information to a rig controller 50 for processing. The controller 50 can include one or more local or remote controllers each with one or more processors for executing instructions retrieved from a non-transitory memory to perform methods described in this disclosure. The rig controller 50 can be communicatively coupled, via wired or wireless network(s), to surface and downhole rig equipment.

The tool 100 can include a window 110 at least partially extending through a wall of a body of the tool 100. The window 110 can allow for reduced attenuation of gamma rays 90 as the gamma rays 90 are detected by the tool 100. The gamma rays 90 can be emitted from radioactive sources naturally occurring in the earthen formation 8 (e.g., Potassium (K), Uranium (U), Thorium (Th), etc.), or they can be emitted from a source provided in the BHA or other locations. The gamma rays 90 can travel through the earthen formation and be detected by the tool 100 when the tool 100 is present in the wellbore 32. As mentioned above, the intensity of the gamma rays can indicate the type of material in the earthen formation and the number of detected gamma radiation pulses can indicate the amount of the material surrounding the wellbore 32. If a gamma ray source 98 is included in the BHA, then the BHA can use the known radiation source 98 to calibrate the tool 100. It should be understood that the known radiation source 98 is not required.

During drilling operations, drilling mud can be pumped from the surface 6 into the drill string 30 (e.g., via pumps supplying mud to the top drive 40) to cool and lubricate the drill bit 38 and to transport cuttings to the surface via an annulus 34 between the drill string 30 and the wellbore 32. At any given depth, the temperature of the drilling mud coming from the surface 6 can typically be lower than that of the formation 8 and of the tool 100. Furthermore, the higher the mud's flow rate, the higher the cooling effect the mud can have on the tool 100. Thus, fluctuations in the flow rate of the drilling mud can result in fluctuations in the temperature of the tool 100. Additionally, the lower the thermal mass of the tool 100, the greater the temperature fluctuations. The current disclosure provides a tool 100 that has an increased thermal mass and is positioned to minimize thermal fluctuations of the tool 100.

Figure 2:
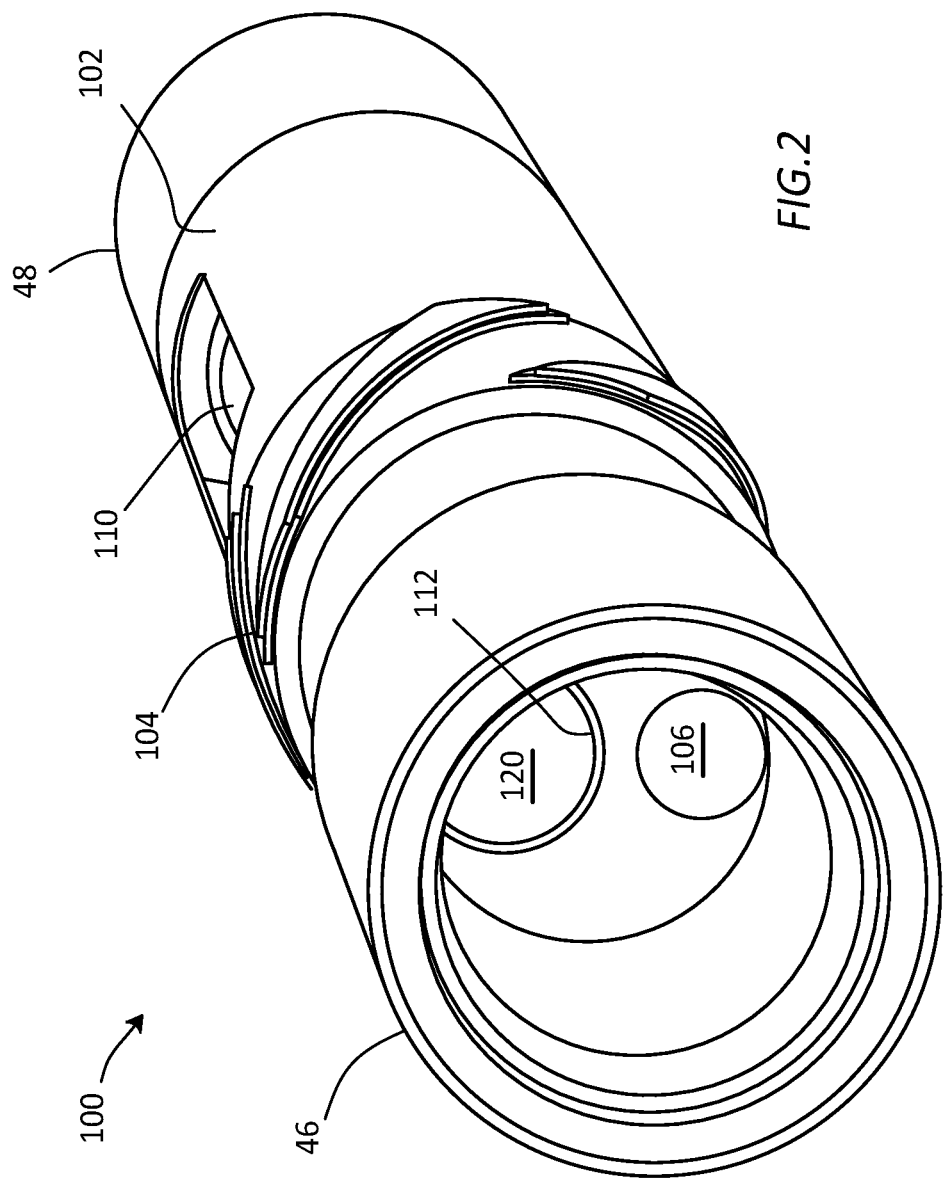
FIGS. 2-3 are representative perspective views of a tool having a gamma ray detector assembly and an associated window, in accordance with certain embodiments.

FIG. 2 is a representative perspective view of a tool 100 having a gamma ray detector assembly 120 and an associated window 110. The tool 100 can be a drill collar 62 modified to accommodate the instrumentation of the tool 100. A drill collar 62 is normally a heavy-walled round bar made from a high-strength alloy of high density (e.g., a Ni—Cr alloy Inconel with a density of 8.2 g/cm3). The drill collar 62 can typically include threaded ends 46, 48 for connecting to other drill collars 62 or other drill string components. The drill collar 62 can make up the body 102 of the tool 100, with threaded ends 46, 48. It should be understood that the ends 46, 48 shown in the referenced figures can be threaded connections as well as a location along the drill collar 62 where the tool 100 function begins and ends, without the end 46 or 48 indicating an actual threaded connection. For example, the end 48 in FIG. 3 can merely indicate the end of the tool 100 and the beginning of another tool or BHA function, without there being a physical delimiter between them. However, it may be preferred that each end 46, 48 be a threaded connection, so the tool 100** can be removed and replaced from the BHA without affecting other BHA functions.

The tool 100 can include wear resistant pads 104 to protect and stabilize the tool 100 during drilling. The tool 100 can also include two bores positioned side-by-side in the tool body 102. One bore can form a cavity 112 into which a gamma ray detector assembly 120 can be installed and sealed for deployment downhole in the BHA. The other bore can be a through bore 106 for providing a flow path for drilling mud to flow past the gamma ray detector assembly 120. The gamma ray detector assembly 120 can include the scintillation crystal and a photomultiplier for detecting the gamma rays 90, as well as electronics for logging the detected gamma rays for transmission to the surface (or for later collection at the surface by surface equipment). When crystal absorbs gamma energy from the gamma rays 90 coming from formation 8, it emits light that can be detected by a photomultiplier in form of pulses. Amplitude of such pulse is substantially proportional to the gamma ray energy level caused by that scintillation. This proportionality allows for a spectral analysis of the formation's radiation based on the intensities of detected pulses.

Some drilling muds, e.g., potassium muds (or mud systems with different potassium chloride KCl concentrations) may also cause scintillation. Scintillation caused by the drilling muds may be undesirable, since the detected radiation can include the radiation from the drilling mud introduced into the wellbore from the surface, thereby diluting the accuracy of the gamma ray spectrum of the wellbore 32. This scintillation can be minimized by excluding mud in the vicinity of a crystal and including non-radioactive components in the construction of the tool 100. Both the scintillation crystal and a photomultiplier can be very sensitive to variations in temperature and these variations can significantly affect a gain of the tool 100. The gain instability can be especially critical when a detector is utilized for a spectral gamma ray measurement, such as the tool 100.

The current disclosure provides a novel positioning of the gamma ray detector assembly 120 in a bore 112 that is surrounded by the body 102 of the tool 100 (i.e., a body of a drill collar 62) and longitudinally positioned proximate a window 110 that can be recessed in the outer surface of the body 102. With the gamma ray detector assembly 120 (also referred to as the detector 120) positioned in the bore 112, which is deep inside the body 102, the tool 100 provides affective shielding of its scintillation crystal and a photomultiplier from natural radiation coming from the formation 8 as well as from radiation of KCl muds. The shielding effect of the tool body 102 could be estimated based on the exponential decay as given in Equation (1) below:

$$I = I_o e^{-\mu \rho t} \qquad (1)$$

where:
I is the intensity after shielding,
$I_o$ is the incident intensity,
$\mu$ is the mass absorption coefficient,
$\rho$ is the density of tool body 102, and
t is the thickness of tool body 102.

From Equation (1), to improve sensitivity to radiation in a desired azimuthal direction, a thickness of the tool body 102 or density of the tool body 102 material in that azimuthal direction can be reduced. The current disclosure discloses a novel way to improve sensitivity to gamma radiation in a desired azimuthal direction.

Figure 3:
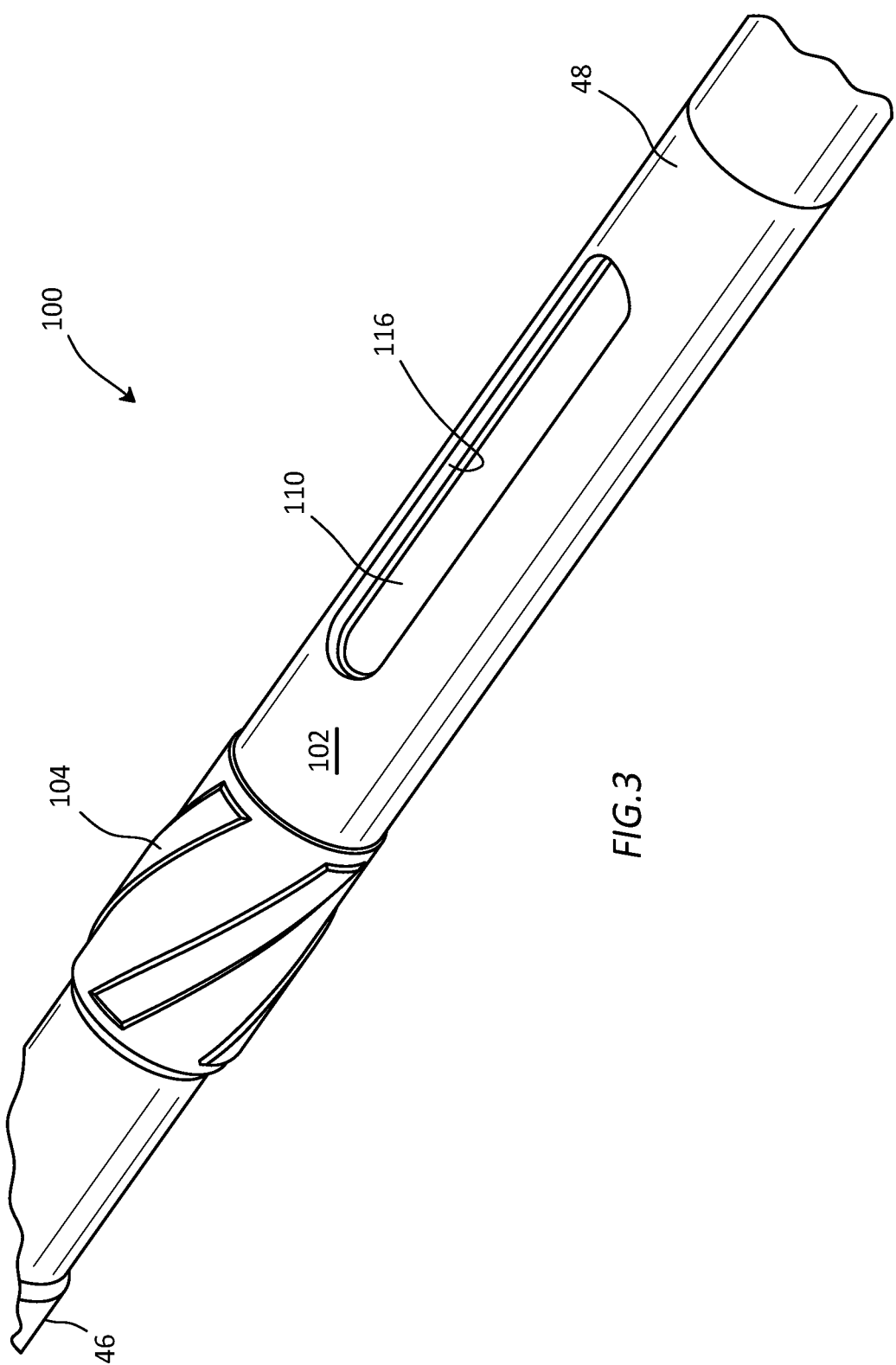

FIG. 3 is a representative perspective view of a tool 100 having a gamma ray detector assembly 120 and an associated window 110. The thickness of the tool body 102 has been reduced by creating a recess 116 in the outer surface of the body 102 to form a window 110 in the body 102. The window 110 can axially extend over the detector 120, which can be located inside the cavity 112. The presence of the window 110 in the body 102 creates a substantial irregularity in shielding caused by the body 102 around the detector 120, which can result in a directional sensitivity of tool 100 allowing for azimuthal mapping of radioactive sources of the gamma rays 90 when tool 100 is rotated while drilling.

Figure 4A:
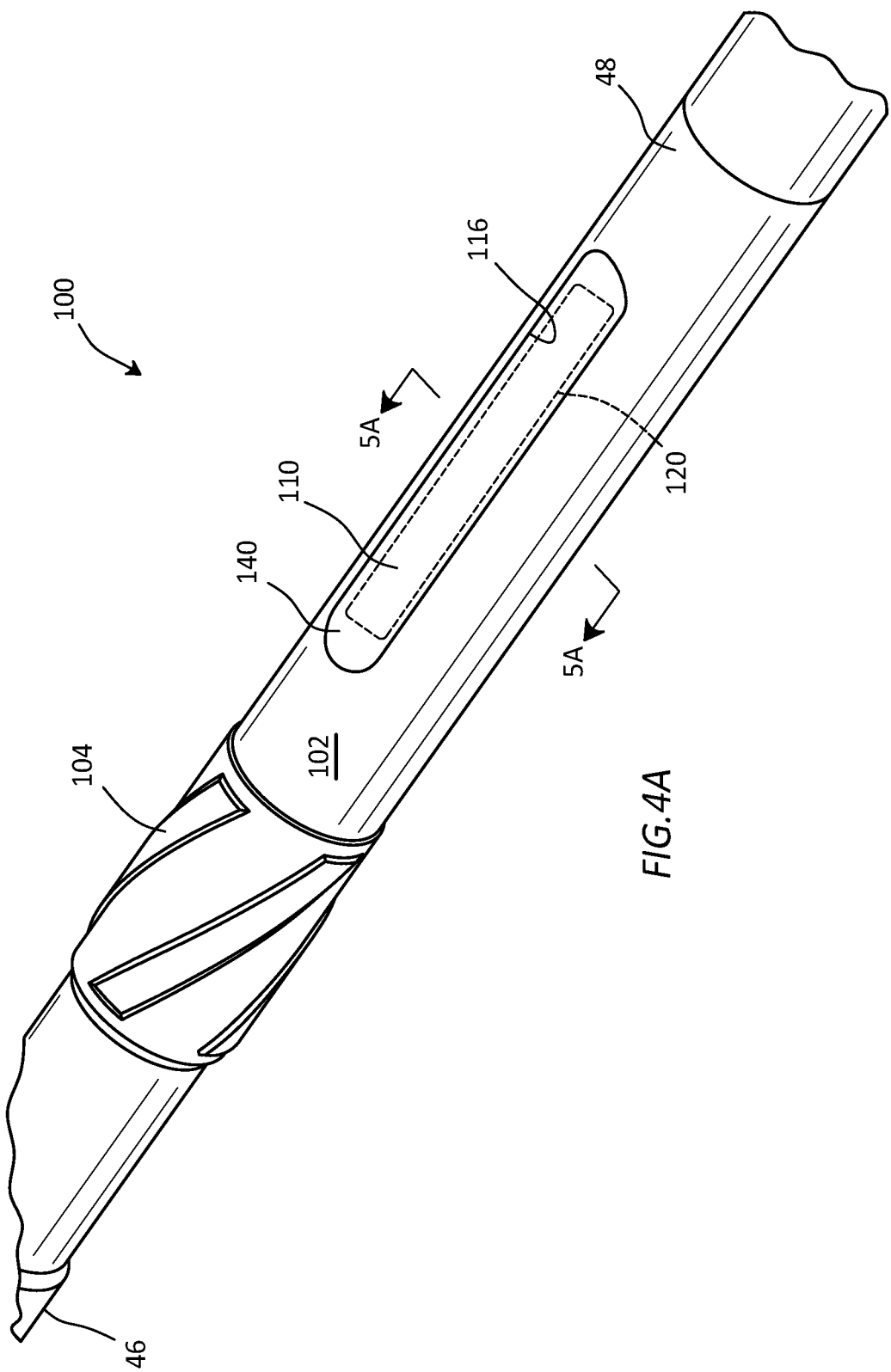
FIG. 4A is a representative perspective view of a tool having a gamma ray detector assembly and a material filled window that can be substantially transparent to gamma rays, in accordance with certain embodiments.

FIG. 4A is a representative perspective view of a tool 100 having a gamma ray detector assembly 120 and an associated window 110 with the window filled with a material 140 that can be substantially transparent to gamma rays 90, such as a low-density material. Filling the window 110 with material 140 can prevent mud from filling the window 110 downhole and provides a barrier that keeps the mud away from the detector 120 at a greater distance than if the window 110 were not filled with the material 140. The material 140 can be a low-density material that can minimize shielding of gamma radiation from the detector 120. The material 140 can be a low thermal conductivity material that can minimize the effect of temperature fluctuations on the detector 120 caused by mud circulation. The material 140 can be a low fluid absorption material that can minimize impregnation with mud, especially, with muds that contain radioactive substances such as KCl muds. The material 140 can include rubber, plastics, composites, elastomers, polymers, etc. It should be understood that the gamma ray detector assembly 120 can include one or more scintillation crystals, one or more photomultiplier assemblies 123, and electronics for detecting gamma rays and logging gamma ray detections. The gamma ray detector assembly 120 can be installed in a cylindrical chassis 121 and then inserted into the cavity 112.

Figure 4B:
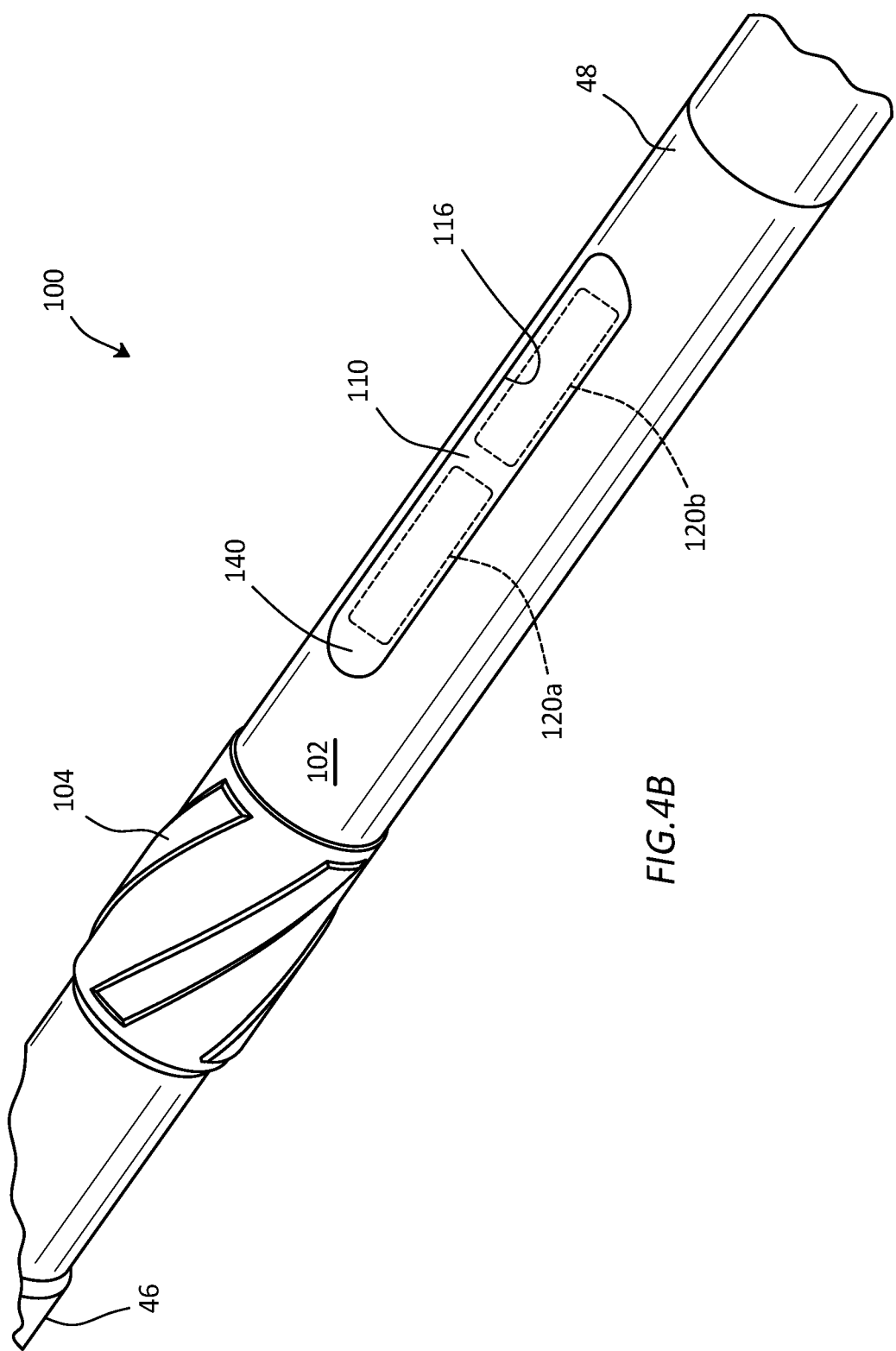
FIG. 4B is a representative perspective view of a tool having at least two gamma ray detector assemblies and a material filled window that can be substantially transparent to gamma rays, in accordance with certain embodiments.

FIG. 4B is a representative perspective view of a tool 100 having at least two gamma ray detector assemblies 120a, 120b with a window 110 filled with a material 140 that can be substantially transparent to gamma rays 90, such as a low-density material. Filling the window 110 with material 140 can prevent mud from filling the window 110 downhole and provides a barrier that keeps the mud away from the detectors 120a, 120b at a greater distance than if the window 110 were not filled with the material 140. The material 140 can be a low-density material that can minimize shielding of gamma radiation from the detectors 120a, 120b. The material 140 can be a low thermal conductivity material that can minimize the effect of temperature fluctuations on the detectors 120a, 120b caused by mud circulation. The material 140 can be a low fluid absorption material that can minimize impregnation with mud, especially, with muds that contain radioactive substances such as KCl muds. The material 140 can include rubber, plastics, composites, elastomers, polymers, etc. It should be understood that each of the gamma ray detector assemblies 120a, 120b can include one or more scintillation crystals 122, one or more photomultiplier assemblies, and electronics for detecting gamma rays and logging gamma ray detections. The gamma ray detector assemblies 120a, 120b can be installed in a cylindrical chassis 121 and then inserted into the cavity 112. Also, the gamma ray detector assemblies 120a, 120b can be installed in a separate cylindrical chassis 121 and then inserted into the cavity 112, such that two cylindrical chassis' 121 are installed in the cavity 112.

Figure 5A:
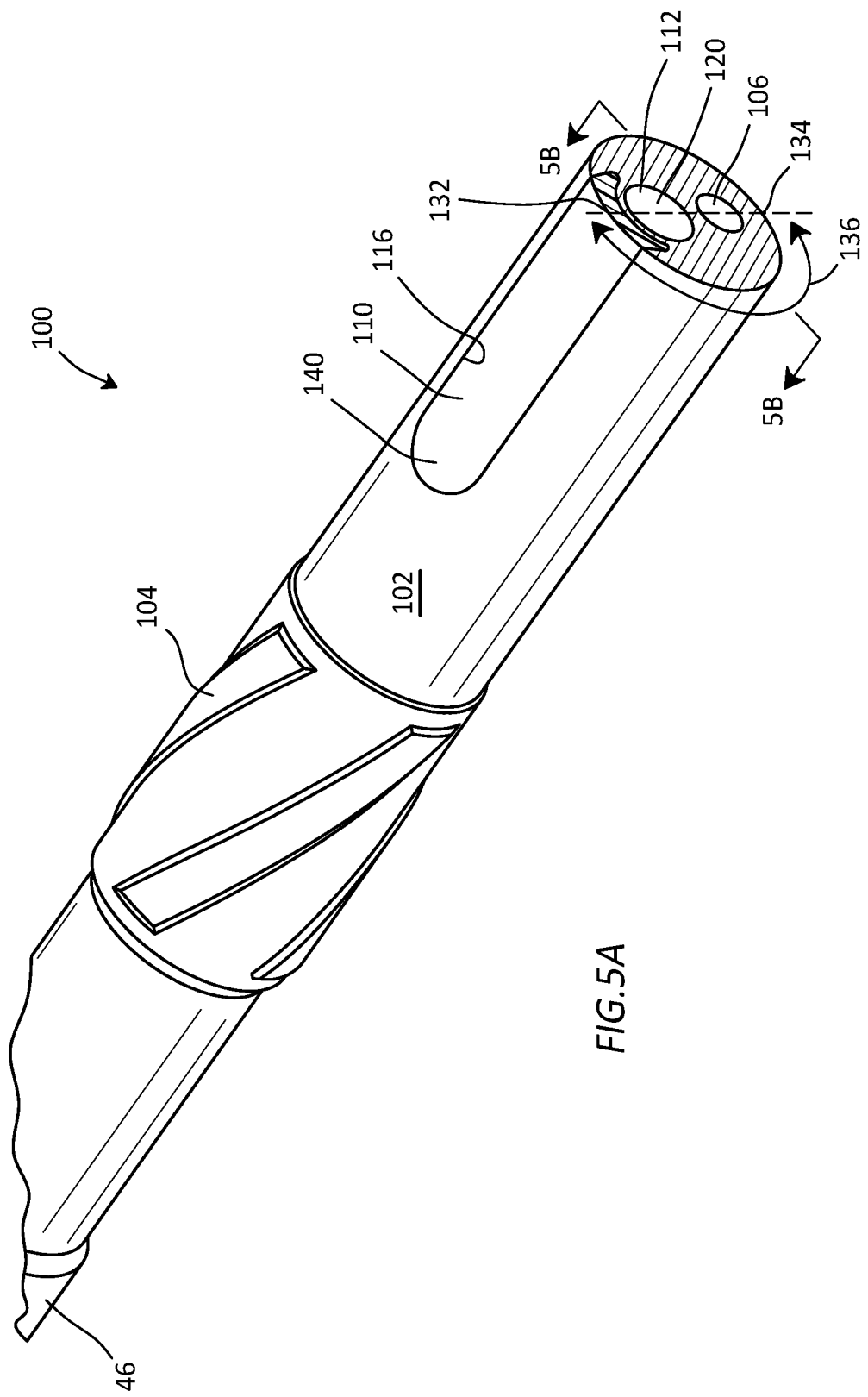
FIG. 5A is a representative partial cross-sectional perspective view along cross-sectional line 5A-5A, as indicated in FIG. 4A, of a gamma ray detector assembly and a material filled window that can be substantially transparent to gamma rays, in accordance with certain embodiments.

FIG. 5A is a representative partial cross-sectional perspective view of the tool 100 having a gamma ray detector assembly 120 installed in the cavity 112 and an associated window 110 filled with the material 140. The window 110 can be milled (or otherwise removed, voided, etc.) from an outer surface of the body 102 to create a recess 116 in the body 102 with an arch-like wall 130 around a portion of the cavity 112. The minimal radial thickness of the arch-like wall 130 can be determined from a structural analysis of the body 102 based on the material of the body 102 and the amount of force downhole (e.g., pressure) the wall 130 needs to withstand.

In one embodiment, the window 110 can be aligned with the offset azimuthal direction (i.e., center 132 of the window 110) of the cavity 112 relative to the central axis of the tool 100 to maximize sensitivity to the formation's 8 radiation that is positioned radially in front of the window 110 (relative to the central axis of the tool 100) and to maximize shielding of the formation's 8 radiation coming from the radially opposite side 134 (i.e., ~180 degrees, arrows 136, from center 132 of window 110) of the body 102.

The material 140 can fill the recess 116 of the window 110 by being potted in-place into the recess 116, injected into the recess 116 through a form that closes off the window 110 during the fill process, fabricated separately (e.g., in a form), and then installed into the recess 116, or any other suitable means for filling the recess 116 with the material 140. A preferred density range for the material 140 is 1.1 g/cm3 to 1.5 g/cm3. The combination of the reduced body thickness caused by forming the recess 116 in the body 102 and the relatively low density of the material 140 can typically provide results in the front-to-back gamma ray sensitivity of about two orders of magnitude, which can provide a superior pattern of azimuthal sensitivity.

FIG. 5B is a representative partial cross-sectional view along cross-section line 5B-5B, as indicated in FIG. 5A, of a gamma ray detector assembly 120 and an associated window 110 filled with a material 140. The cavity 112 can be a cylindrical bore formed in the body 102 of the tool 100 with the axis of the cavity 112 being radially offset from a central axis of the tool 100. The cavity 112 can be fully surrounded by the body 102 to provide a pressure barrier from downhole pressures when the detector 120 is installed and sealed in the cavity 112 and provide a thermal mass around the detector 120 to minimize temperature fluctuations of the detector 120. The detector 120, with its associated electronics 126, can be mounted to a chassis of cylindrical shape, loaded into the cavity 112, and sealed to prevent drilling mud entering the cavity 112 or the detector 120. The electronics 126 can be electrically connected to the scintillation crystal and a photomultiplier assembly via conductors 124. The electronics 126 can receive power from an electrical power source 128, such as a battery, a capacitor, a fuel cell, or another energy storage device.

It should be understood that the indicated positions of the detector 120 components in the cylindrical chassis 121 and the cavity 112 are merely exemplary positions and are not required positions for these components. These components, as well as other components, can be positioned within the cylindrical chassis 121 as needed to accommodate the gamma ray detecting function of the detector 120. The electronics 126 can include telemetry devices for communicating the gamma ray spectrum measurements in real-time or near real-time to equipment external to the tool 100 (e.g., surface equipment). The electronics 126 can also include non-transitory memory devices for storing the gamma ray spectrum measurements until they can be retrieved by surface equipment.

The recess 116 of the window 110 can form an arch-type wall 130 at the bottom of the recess that is below the outer surface of the body 102 and is formed between the cavity 112 and the window 110. As mentioned above, the window 110 can be filled with the material 140, providing a substantially continuous circular outer surface of the tool 100. The gamma rays 90 from the formation 8 can radiate toward the tool 100, with some gamma rays 90 being reflected or absorbed as gamma rays 92 by the body 102. Some of the gamma rays 90 can travel through the material 140 and the arch-type wall 130 to be absorbed (arrows 94) by the scintillation crystal 122 and logged by the detector 120. As can be seen, the detector 120 allows gamma rays 90 through the window 110 and minimizes detection of gamma rays 90 not coming from the azimuthal position of the window 110 relative to the center axis of the tool 100.

The recess 116 of the window 110 allows the detector 120 to be positioned deep within the body 102 while minimizing shielding of gamma rays 90 in the azimuthal direction of the window 110. The arch-type wall 130 can be configured to provide minimal shielding of the gamma rays 90 while providing the strength necessary to withstand downhole pressures. The large mass of the body 102 and the window 110 provide thermal insulation for the detector 120 by slowing down temperatures changes in the wellbore that reach the detector 120. The temperatures may change over time, but transient fluctuations that can greatly impact the accuracy of the detector 120 are minimized and the rate of change of the temperature of the detector 120 can be slowed down due to the large thermal mass of the body 102 and the window 110. The through bore 106 is also offset from the central axis of the tool in an opposite direction from the cavity 112. This ensures that the mud flowing in the through bore 106 also does not cause temperature fluctuations in the detector 120, since there is a significant amount of the body 102 that remains between the cavity 112 and the through bore 106.

Figure 5C:
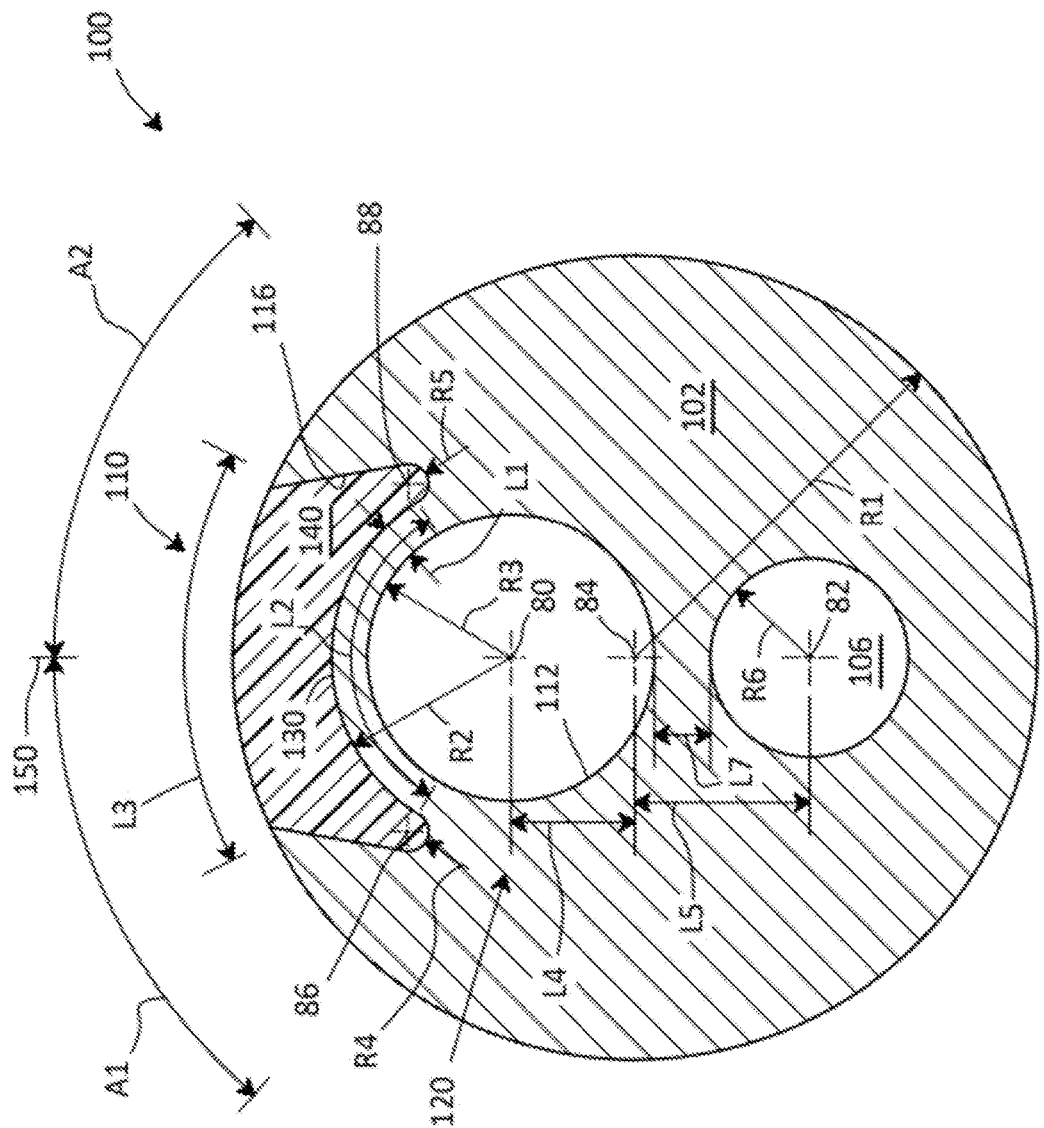

FIG. 5C is a representative partial cross-sectional view along cross-section line 5B-5B, as indicated in FIG. 5A, of a gamma ray detector assembly 120 and an associated window 110 filled with a material 140. The tool 100 can have a cylindrical shape with a central axis 84 and a radius R1. The recess 116 of the window 110 can form a dovetail shape with the walls of the recess 116 extending at an angle from the outer surface of the body 102 to a rounded edge, with one wall extending to the rounded end with a radius R4 around an axis 86, with the second wall extending to the rounded end with a radius R5 around an axis 88. The window 110 can extend along the outer surface of the body 102 by an arc length L3. This arc length L3 represents the size of the circumferential opening of the recess 116 when the material 140 is not installed in the recess 116. When the material 140 is installed in the recess 116, the material 140 can form, along with the body 102, a circular shape of radius R1 relative to the center axis 84. The material 140 can be retained in the recess 116 by various methods, such as screws, brackets, adhesives, the dovetail shape mentioned above, as well as other suitable retention means.

The cavity 112 is shown as a cylindrical shape that has been formed (e.g., bored) into the body 102 just below the window 110. The arch-like wall 130 can be formed between the bottom surface of the recess 116 and the inner surface of the cavity 112. The arch-like wall 130 can have a substantially uniform thickness L1 between the recess 116 and the cavity 112, with the arch-like wall extending a circumferential distance L2 relative to the axis 80 of the cavity 112. The arch-like wall 130 can include surfaces that are coaxially aligned relative to the axis 80 at least for the arc length L2, with the inner surface of the cavity 112 having a radius R3 from the axis 80 and the bottom surface of the recess 116 having a radius R2 from the axis 80. The axis 80 of the cavity 112 can be offset in an azimuthal direction from the tool 100 center axis 84 by a distance L4, with an axis 82 of the through bore 106 being offset in an opposite azimuthal direction from the axis 80 by a distance L5. The through bore 106 can have a radius of R6, which can be determined by the cross-sectional area needed to accommodate the needed mud flow through the tool 100. The minimal thickness of the body 102 between the cavity 112 and the through bore 106 can be seen as the thickness L7.

The window 110 provides an increased sensitivity (or decreased shielding) of the tool 100 to gamma rays 90 received from the formation from the azimuthal direction 150 relative to the central axis 84 of the tool 100, with the axis of the cavity and the longitudinal center of the window 110 being in line with the azimuthal direction 150. The sensitivity of the tool 100 can be reduced to gamma rays 90 received from the formation from the azimuthal directions that are greater than +/−30 degrees (refer to angles A1 and A2), greater than +/−35 degrees, greater than +/−40 degrees, greater than +/−45 degrees, greater than +/−50 degrees, greater than +/−60 degrees, greater than +/−70 degrees, greater than +/−80 degrees, or greater than +/−90 degrees from the azimuthal direction 150.

Figure 6:
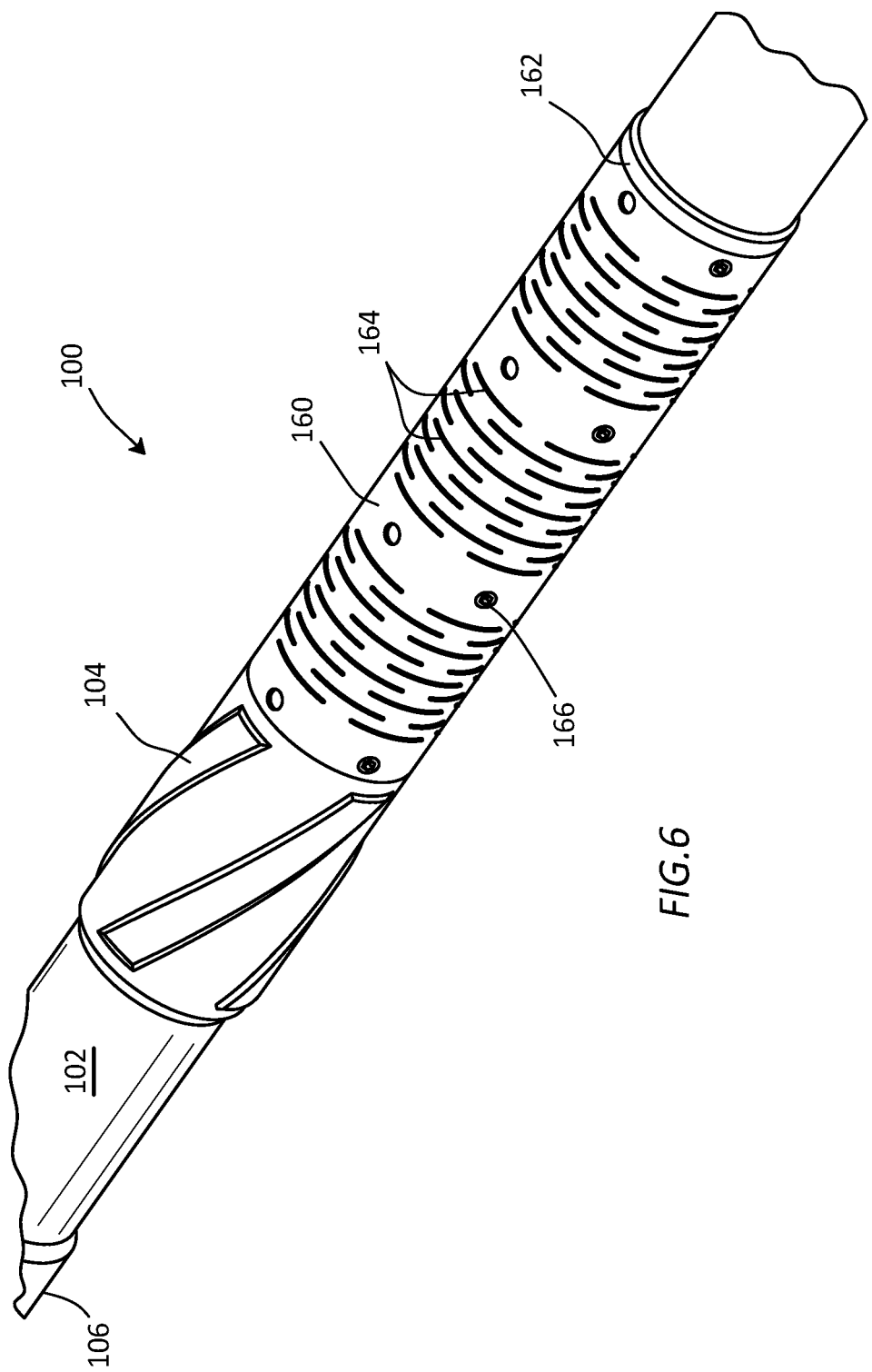
FIG. 6 is a representative perspective view of a tool having a gamma ray detector assembly and a protective sleeve overlaying the tool, in accordance with certain embodiments.

FIG. 6 is a representative perspective view of a tool 100 having a gamma ray detector assembly 120 and a protective sleeve 160 overlaying the tool 100 and the window 110. The sleeve 160 can also be used to retain the material 140 within the recess 116. The protective sleeve 160 can be installed over tool 100 and locked in place by a ring 162 and screws 166. The protective sleeve 160 can include other features, such as an array of slots 164, to reduce its stiffness and minimize stresses as the tool 100 deforms while drilling. The sleeve 160 can also be made from a material that is low-density thereby minimizing and shielding of the gamma rays 90 from the detector 120. The protective sleeve 160 can be used with any of the embodiments of the tool 100 provided in this disclosure.

Figure 7A:
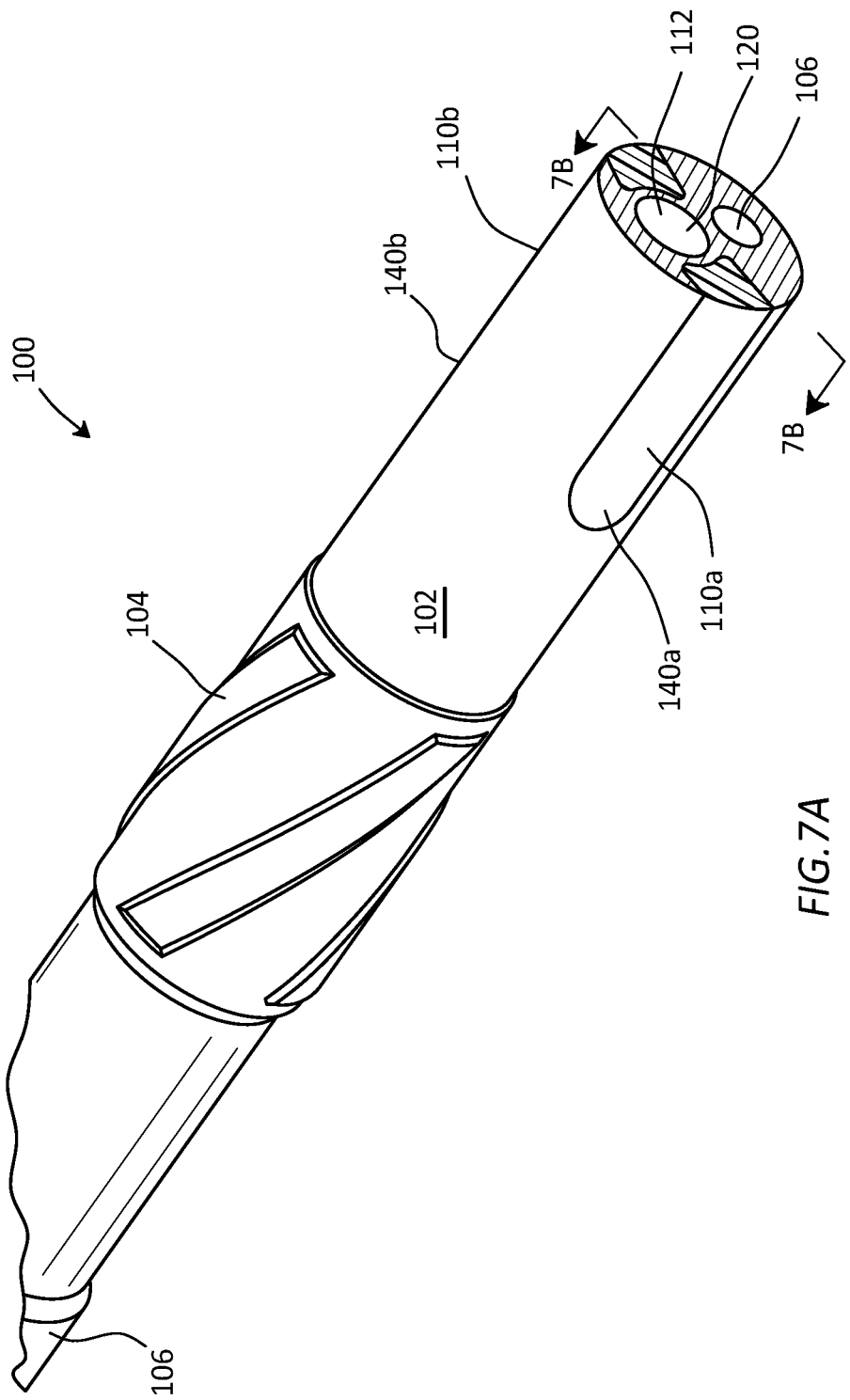
FIG. 7A is a representative partial cross-sectional perspective view of a tool having a gamma ray detector assembly and multiple associated material filled windows that can be substantially transparent to gamma rays, in accordance with certain embodiments.

FIG. 7A is a representative partial cross-sectional perspective view of a tool 100 having a gamma ray detector assembly 120 and multiple associated windows 110a, 110b with the respective windows filled with a material 140a, 140b that can be substantially transparent to gamma rays 90. This dual-window configuration can be used to provide additional reduction in shielding of the gamma rays 90 from the detector 120 housed in the cavity 112. In this configuration, multiple azimuthal directions of the windows 110a, 110b allow more gamma rays 90 to enter the tool 100 and be detected by the detector 120. Even though there are multiple windows 110a, 110b, these individual windows function similarly to the single window 110 of the previous embodiments. In general, additional composite windows can be added to increase the front sensitivity or to optimize the performance of the tool 100, including its mechanical strength under drilling loads. For example, the single window 110a can be made up of multiple narrower windows that provide additional strength of the tool body 102, while still allowing reduced shielding of the gamma rays 90 from the formation 8.

FIG. 7B is a representative partial cross-sectional view along cross-section line 7B-7B, as indicated in FIG. 7A, of a gamma ray detector assembly 120 and multiple associated windows 110a, 110b with the respective windows being filed with a material 140a, 140b. The recess 116a of the window 110a can be separated from the cavity 112 by the arch-like wall 130a, and recess 116b of the window 110b can be separated from the cavity 112 by the arch-like wall 130b. The detector 120 can include one or more scintillation crystals 122a, 122b and associated photomultipliers with the electronics 126 electrically coupled to them to capture the indicated detection of the gamma rays 90. The detector 120 components can be assembled into a cylindrical chassis 121, inserted into the cavity 112, and sealed from drilling mud in preparation for deployment into a wellbore 32. The through bore 106 with inner surface 108 can be formed through the tool 100 to provide a flow path through the tool 100 for drilling mud.

Figure 7C:
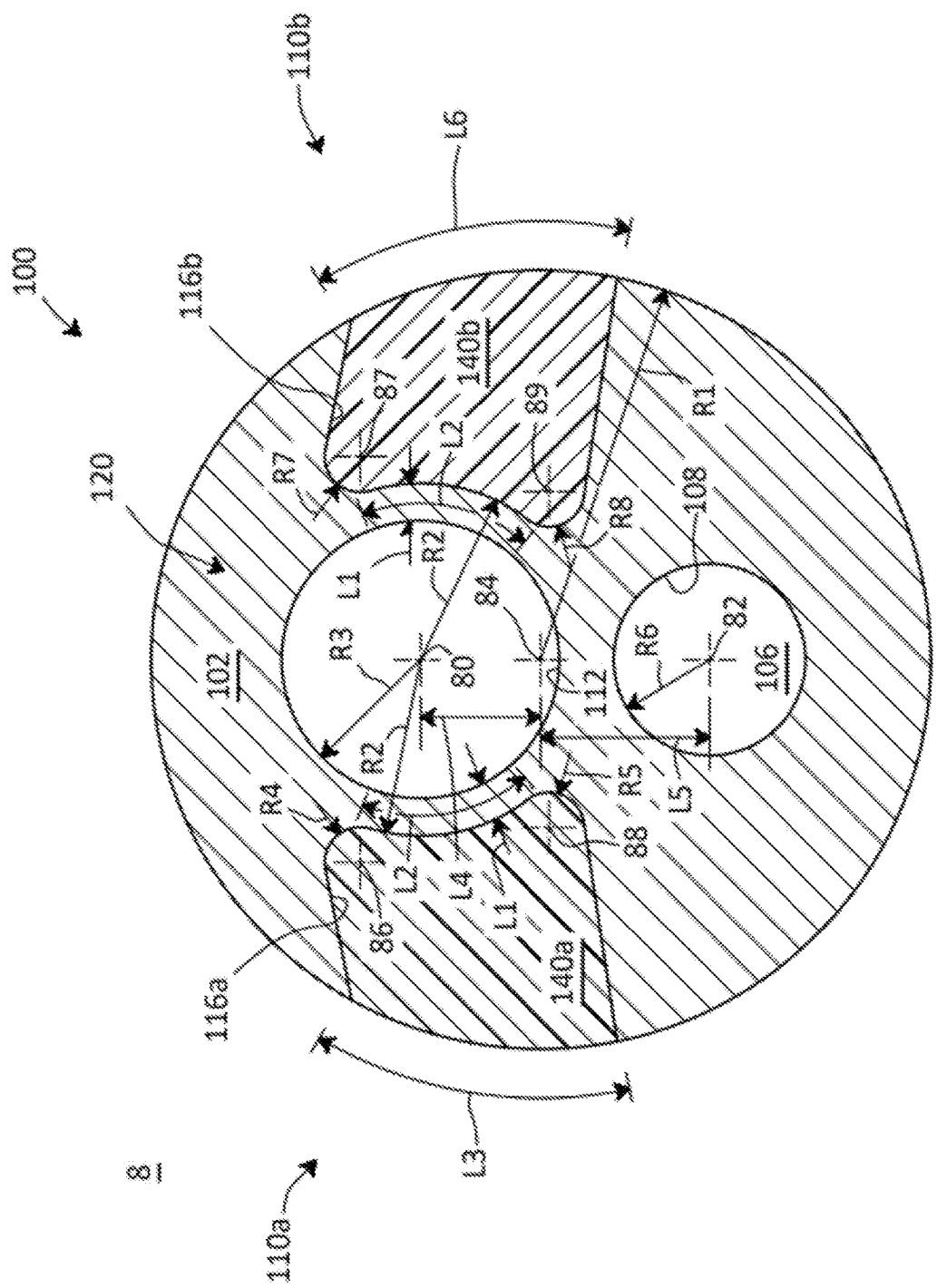

FIG. 7C is a representative partial cross-sectional view along cross-section line 7B-7B, as indicated in FIG. 7A, of a gamma ray detector assembly 120 and multiple associated windows 110a, 110b with the respective windows being filed with a material 140a, 140b. As in the single window configuration (see at least FIGS. 5A-5C), the axis 80 of the cavity 112 can be radially offset in an azimuthal direction a distance L4 from the central axis 84 of the tool 100. The axis 82 of the through bore 106 can be radially offset in an opposite azimuthal direction, relative to the central axis 84, a distance L5 from the central axis 84 of the tool 100. The windows 110a, 110b can be azimuthally oriented relative to the axis 80 of the cavity 112 at an obtuse angle relative to each other.

The recess 116a of the window 110a can form an arch-like wall 130a between the window 110a and the cavity 112. The arch-like wall 130a can have a substantially uniform thickness L1 for the arc distance L2. The arch-like wall 130a can be formed between the bottom surface of the recess 116a and the inner surface of the cavity 112. The arch-like wall 130a can have a substantially uniform thickness L1 between the recess 116a and the cavity 112, with the arch-like wall extending a circumferential distance L2 relative to the axis 80 of the cavity 112. The arch-like wall 130a can include surfaces that are coaxially aligned relative to the axis 80 at least for the arc length L2, with the inner surface of the cavity 112 having a radius R3 from the axis 80 and the bottom surface of the recess 116a having a radius R2 from the axis 80.

The recess 116a can be filled with the material 140a to form a reduced shielding path for the gamma rays 90 to reach the detector 120. The recess 116a can form a dovetail shape with one side wall extending from the outer surface of the body 102 to a rounded end with radius R4 about an axis 86 and another side wall extending from the outer surface of the body 102 to a rounded end with radius R5 about an axis 88. The material 140a can form, along with the body 102, a continuous circumferential perimeter of the tool 100 with a radius R1 relative to the central axis 84, with the material 140a extending circumferentially an arc distance L3.

The recess 116b of the window 110b can form an arch-like wall 130b between the window 110b and the cavity 112. The arch-like wall 130b can have a substantially uniform thickness L1 for the arc distance L2. The arch-like wall 130b can be formed between the bottom surface of the recess 116b and the inner surface of the cavity 112. The arch-like wall 130b can have a substantially uniform thickness L1 between the recess 116b and the cavity 112, with the arch-like wall extending a circumferential distance L2 relative to the axis 80 of the cavity 112. The arch-like wall 130b can include surfaces that are coaxially aligned relative to the axis 80 at least for the arc length L2, with the inner surface of the cavity 112 having a radius R3 from the axis 80 and the bottom surface of the recess 116b having a radius R2 from the axis 80.

The recess 116b can be filled with the material 140b to form a reduced shielding path for the gamma rays 90 to reach the detector 120. The recess 116b can form a dovetail shape with one side wall extending from the outer surface of the body 102 to a rounded end with radius R7 about an axis 87 and another side wall extending from the outer surface of the body 102 to a rounded end with radius R8 about an axis 89. The material 140b can form, along with the body 102, a continuous circumferential perimeter of the tool 100 with a radius R1 relative to the central axis 84, with the material 140b extending circumferentially an arc distance L6.

FIGS. 7A-7C show both windows 110a, 110b to be substantially identical regarding thicknesses, shapes, and sizes. However, it should be understood that the thicknesses, shapes, and sizes of the window 110a can be different than the thicknesses, shapes, and sizes of the window 110b. It is not a requirement that the thicknesses, shapes, and sizes of each window be the same.

VARIOUS EMBODIMENTS

Embodiment 1. A system for performing a subterranean operation, the system comprising:
a tool for detecting gamma rays, the tool comprising:
a body;
a gamma ray detector assembly disposed within the body, such that the body radially surrounds the gamma ray detector assembly, with the gamma ray detector assembly configured to detect the gamma rays; and
a window formed in an outer surface of the body, such that the window is axially aligned with the gamma ray detector assembly.

Embodiment 2. The system of embodiment 1, wherein the body is a drill collar.

Embodiment 3. The system of embodiment 1, wherein the gamma ray detector assembly comprises a scintillation crystal, a photomultiplier assembly, and electronics for detecting gamma rays and logging gamma ray detections.

Embodiment 4. The system of embodiment 1, wherein the gamma ray detector assembly comprises one or more scintillation crystals, one or more photomultiplier assemblies, and electronics for detecting gamma rays and logging gamma ray detections.

Embodiment 5. The system of embodiment 1, wherein the gamma ray detector assembly comprises first and second gamma ray detector assemblies, with each of the first and second gamma ray detector assemblies comprising one or more scintillation crystals, one or more photomultiplier assemblies, and electronics for detecting gamma rays and logging gamma ray detections.

Embodiment 6. The system of embodiment 1, wherein the gamma ray detector assembly comprises first and second gamma ray detector assemblies, with each of the first and second gamma ray detector assemblies comprising a scintillation crystal, a photomultiplier assembly, and electronics for detecting gamma rays and logging gamma ray detections.

Embodiment 7. The system of embodiment 1, further comprising a first bore and a second bore longitudinally formed in the body and parallel to a central axis of the body, wherein the gamma ray detector assembly is disposed in the first bore and the second bore allows drilling mud to flow through the body.

Embodiment 8. The system of embodiment 7, wherein the first bore is radially offset from the central axis in a first radial direction and the second bore is radially offset from the central axis in a second radial direction that is opposite the first radial direction.

Embodiment 9. The system of embodiment 1, wherein the window comprises a recess formed in the outer surface of the body, and wherein the recess forms an arch-like wall between a first bore in the body and the recess, with the first bore being configured to receive the gamma ray detector assembly.

Embodiment 10. The system of embodiment 9, wherein the arch-like wall is disposed between the recess and the first bore, wherein a bottom of the recess forms an outer surface of the arch-like wall and an inner surface of the first bore forms an inner surface of the arch-like wall.

Embodiment 11. The system of embodiment 10, wherein the outside surface of the arch-like wall has a first radius relative to an axis of the first bore and the inner surface of the arch-like wall has a second radius relative to the axis of the first bore, with the first radius being larger than the second radius.

Embodiment 12. The system of embodiment 9, wherein the recess is filled with a material, and wherein the material is selected from a group consisting of a low-density material, a low thermal conductivity material, a low fluid absorption material, and combinations thereof.

Embodiment 13. The system of embodiment 9, wherein the recess if filled with a material such that the outer surface of the body and an outer surface of the material cooperate to form a circular outer surface of the tool.

Embodiment 14. The system of embodiment 1, wherein the window has a dovetail shaped cross-section, which is configured to retain a material when the material fills the window.

Embodiment 15. The system of embodiment 1, wherein the body provides a thermal mass surrounding the gamma ray detector assembly, and wherein the thermal mass reduces fluctuations in temperature of the gamma ray detector assembly.

Embodiment 16. The system of embodiment 1, wherein the window provides an increased sensitivity of the gamma ray detector assembly to gamma rays at a first azimuthal direction relative to a central axis of the tool when compared to a sensitivity of the gamma ray detector assembly to gamma rays at a second azimuthal direction relative to a central axis of the tool, with the second azimuthal direction being greater than +/−30 degrees from the first azimuthal direction.

Embodiment 17. The system of embodiment 1, wherein the tool further comprising a protective sleeve that surrounds the body.

Embodiment 18. The system of embodiment 17, wherein the protective sleeve is held in an axial position over the tool by a lock ring.

Embodiment 19. The system of embodiment 17, wherein the sleeve comprises a plurality of slots.

Embodiment 20. A system for performing a subterranean operation, the system comprising:
a tool for detecting gamma rays, the tool comprising:
a body;
a gamma ray detector assembly disposed within the body, such that the body radially surrounds the gamma ray detector assembly, with the gamma ray detector assembly configured to detect the gamma rays; and
a first window and a second window formed in an outer surface of the body, such that the first window and the second window are axially aligned with the gamma ray detector assembly.

Embodiment 21. The system of embodiment 20, wherein the body is a drill collar.

Embodiment 22. The system of embodiment 20, wherein the gamma ray detector assembly comprises a scintillation crystal, a photomultiplier assembly, and electronics for detecting gamma rays and logging gamma ray detections.

Embodiment 23. The system of embodiment 20, wherein the gamma ray detector assembly comprises one or more scintillation crystals, one or more photomultiplier assemblies, and electronics for detecting gamma rays and logging gamma ray detections.

Embodiment 24. The system of embodiment 20, wherein the gamma ray detector assembly comprises first and second gamma ray detector assemblies, with each of the first and second gamma ray detector assemblies comprising one or more scintillation crystals, one or more photomultiplier assemblies, and electronics for detecting gamma rays and logging gamma ray detections.

Embodiment 25. The system of embodiment 20, wherein the gamma ray detector assembly comprises first and second gamma ray detector assemblies, with each of the first and second gamma ray detector assemblies comprising a scintillation crystal, a photomultiplier assembly, and electronics for detecting gamma rays and logging gamma ray detections.

Embodiment 26. The system of embodiment 20, further comprising a first bore and a second bore longitudinally formed in the body and parallel to a central axis of the body, wherein the gamma ray detector assembly is disposed in the first bore and the second bore allows drilling mud to flow through the body.

Embodiment 27. The system of embodiment 26, wherein the first bore is radially offset from the central axis in a first radial direction and the second bore is radially offset from the central axis in a second radial direction that is opposite the first radial direction.

Embodiment 28. The system of embodiment 20, wherein each of the first window and the second window comprise a recess formed in the outer surface of the body, and wherein each of the recesses forms an arch-like wall between a first bore in the body and a respective one of the recesses, with the first bore being configured to receive the gamma ray detector assembly.

Embodiment 29. The system of embodiment 28, wherein the arch-like wall is disposed between the respective one of the recesses and the first bore, wherein a bottom of the respective one of the recesses forms an outer surface of the respective one of the arch-like walls and an inner surface of the first bore forms an inner surface of the respective one of the arch-like walls.

Embodiment 30. The system of embodiment 29, wherein the outside surface of the respective one of the arch-like walls has a first radius relative to an axis of the first bore and the inner surface of the respective one of the arch-like walls has a second radius relative to the axis of the first bore, with the first radius being larger than the second radius.

Embodiment 31. The system of embodiment 28, wherein each of the recesses is filled with a material, and wherein the material is selected from a group consisting of a low-density material, a low thermal conductivity material, a low fluid absorption material, and combinations thereof.

Embodiment 32. The system of embodiment 28, wherein each of the recesses is filled with a material such that the outer surface of the body and an outer surface of the material cooperate to form a circular outer surface of the tool.

Embodiment 33. The system of embodiment 20, wherein each of the first window and the second window has a dovetail shaped cross-section, which is configured to retain a material when the material fills a respective one of the windows.

Embodiment 34. The system of embodiment 20, wherein the tool further comprising a protective sleeve that surrounds the body.

Embodiment 35. The system of embodiment 34, wherein the protective sleeve is held in an axial position over the tool by a lock ring.

Embodiment 36. The system of embodiment 34, wherein the sleeve comprises a plurality of slots.

Embodiment 37. A method for performing a subterranean operation the method comprising:
receiving gamma rays from a formation into a logging tool, with the gamma rays passing through a portion of a body of a drill collar and being absorbed into a gamma ray detector assembly which is disposed within the body;
detecting the absorbed gamma rays along a wellbore via the gamma ray detector assembly;
indicating, via the logging tool, an azimuthal orientation of the absorbed gamma rays relative to the wellbore; and
logging, via the logging tool, the detected gamma rays, and the indicated azimuthal orientation.

Embodiment 38. The method of embodiment 37, wherein the receiving gamma rays further comprises receiving gamma rays through at least one window in an outer surface of the body.

Embodiment 39. The method of embodiment 38, further comprising filling the window with a material that is selected from the group consisting of a low-density material, a low thermal conductivity material, a low fluid absorption material, and combinations thereof.

Embodiment 40. The method of embodiment 38, further comprising installing the gamma ray detector assembly in a first bore in the body, and axially aligning the gamma ray detector assembly with the window.

Embodiment 41. The method of embodiment 37, wherein the receiving gamma rays further comprises receiving gamma rays through a first window and a second window in an outer surface of the body, wherein the first window is azimuthally offset from the second window relative to the gamma ray detector assembly.

Embodiment 42. The method of embodiment 41, further comprising filling the first window and the second window with a material that is selected from the group consisting of a low-density material, a low thermal conductivity material, a low fluid absorption material, and combinations thereof.

Embodiment 43. The method of embodiment 41, further comprising installing the gamma ray detector assembly in a first bore in the body and axially aligning the gamma ray detector assembly with the first window and the second window.

While the present disclosure may be susceptible to various modifications and alternative forms, specific embodiments have been shown by way of example in the drawings and tables and have been described in detail herein. However, it should be understood that the embodiments are not intended to be limited to the particular forms disclosed. Rather, the disclosure is to cover all modifications, equivalents, and alternatives falling within the spirit and scope of the disclosure as defined by the following appended claims. Further, although individual embodiments are discussed herein, the disclosure is intended to cover all combinations of these embodiments.

What is claimed is:

1. A system for performing a subterranean operation, the system comprising:
    a tool for detecting gamma rays, the tool comprising:
    a body;
    a gamma ray detector assembly disposed within a bore of the body, such that the body radially surrounds the gamma ray detector assembly, with the gamma ray detector assembly configured to detect the gamma rays, wherein the gamma ray detector assembly comprises one or more scintillation crystals and one or more photomultipliers; and
    a window formed in an outer surface of the body, such that the window is axially aligned with the gamma ray detector assembly, wherein the window comprises a recess extending radially inward from an exterior surface of the body, and wherein the exterior surface is in pressure communication with a pressure that is external to the tool.

2. The system of claim 1, wherein the gamma ray detector assembly further comprises one or more scintillation crystals, one or more photomultiplier assemblies, and electronics for detecting gamma rays and logging gamma ray detections.

3. The system of claim 1, wherein the gamma ray detector assembly comprises first and second gamma ray detector assemblies, with each of the first and second gamma ray detector assemblies comprising one or more scintillation crystals, one or more photomultiplier assemblies photomultipliers, and electronics for detecting gamma rays and logging gamma ray detections.

4. The system of claim 1, further comprising a first bore and a second bore longitudinally formed in the body, wherein the gamma ray detector assembly is disposed in the first bore and the second bore allows drilling mud to flow through the body.

5. The system of claim 1, wherein the window comprises a recess formed in the outer surface of the body, and wherein the recess forms an arch-like wall between a first bore in the body and the recess, with the first bore being configured to receive the gamma ray detector assembly.

6. The system of claim 1, wherein the window has a dovetail shaped cross-section, which is configured to retain a material when the material fills the window.

7. The system of claim 1, wherein the body provides a thermal mass surrounding the gamma ray detector assembly, and wherein the thermal mass reduces fluctuations in temperature of the gamma ray detector assembly.

8. The system of claim 1, wherein the window provides an increased sensitivity of the gamma ray detector assembly to gamma rays at a first azimuthal direction relative to a central axis of the tool when compared to a sensitivity of the gamma ray detector assembly to gamma rays at a second azimuthal direction relative to a central axis of the tool with the second azimuthal direction being greater than +/−30 degrees from the first azimuthal direction.

9. The system of claim 1, wherein the tool further comprising a protective sleeve that surrounds the body, and wherein the protective sleeve is held in an axial position over the tool.

10. A system for performing a subterranean operation, the system comprising:
    a tool for detecting gamma rays, the tool comprising:
    a body;
    a gamma ray detector assembly disposed within a bore of the body, such that the body radially surrounds the gamma ray detector assembly, with the gamma ray detector assembly configured to detect the gamma rays, wherein the gamma ray detector assembly comprises one or more scintillation crystals and one or more photomultipliers; and
    a first window and a second window formed in an outer surface of the body, such that the first window and the second window are axially aligned with the gamma ray detector assembly, wherein the first window comprises a first recess extending radially inward from an exterior surface of the body, wherein the second window comprises a second recess extending radially inward from an exterior surface of the body, and wherein the exterior surface is in pressure communication with a pressure that is external to the tool.

11. The system of claim 10, wherein the gamma ray detector assembly further comprises one or more scintillation crystals, one or more photomultiplier assemblies, and electronics for detecting gamma rays and logging gamma ray detections.

12. The system of claim 10, wherein the gamma ray detector assembly comprises first and second gamma ray detector assemblies, with each of the first and second gamma ray detector assemblies comprising one or more scintillation crystals, one or more photomultiplier assemblies photomultipliers, and electronics for detecting gamma rays and logging gamma ray detections.

13. The system of claim 10, further comprising a first bore and a second bore longitudinally formed in the body, wherein the gamma ray detector assembly is disposed in the first bore and the second bore allows drilling mud to flow through the body.

14. The system of claim 10, wherein each of the first window and the second window comprise a recess formed in the outer surface of the body, and wherein each of the recesses forms an arch-like wall between a first bore in the body and a respective one of the recesses, with the first bore being configured to receive the gamma ray detector assembly.

15. The system of claim 10, wherein each of the first window and the second window has a dovetail shaped cross-section, which is configured to retain a material when the material fills a respective one of the windows.

16. The system of claim 10, wherein the tool further comprising a protective sleeve that surrounds the body and is held in an axial position over the tool by a lock ring.

17. A method for performing a subterranean operation the method comprising:
  receiving gamma rays from a formation into a logging tool, with the gamma rays passing through a composite portion of a body of a drill collar and being absorbed into a gamma ray detector assembly which is disposed within a bore of the body, such that the body radially surrounds the gamma ray detector assembly, wherein the gamma ray detector assembly comprises one or more scintillation crystals and one or more photomultipliers, wherein the composite portion is disposed in a window formed in an outer surface of the body, wherein the window comprises a recess extending radially inward from an exterior surface of the body, and wherein the exterior surface and the composite portion are in pressure communication with a pressure that is external to the tool;
  detecting the absorbed gamma rays along a wellbore via the gamma ray detector assembly;
  indicating, via the logging tool, an azimuthal orientation of the composite portion of the body relative to the wellbore; and
  logging, via the logging tool, the detected gamma rays and the indicated azimuthal orientation.

18. The method of claim 17, wherein the receiving gamma rays further comprises receiving gamma rays through at least one window in an outer surface of the body, with the window filled with a material that is selected from the group consisting of a low-density material, a low thermal conductivity material, a low fluid absorption material, and combinations thereof.

19. The method of claim 18, further comprising installing the gamma ray detector assembly in a first bore in the body, and axially aligning the gamma ray detector assembly with the window.

20. The method of claim 17, wherein the receiving gamma rays further comprises receiving gamma rays through a first window and a second window in an outer surface of the body, wherein the first window is azimuthally offset from the second window relative to the gamma ray detector assembly.

* * * * *